United States Patent Office 3,223,695
Patented Dec. 14, 1965

3,223,695
MONOOLEFIN POLYMERS DESTATICIZED WITH ALKYL POLYAMINES
Major L. Gallaugher, Bartlesville, Okla., assignor to Phillips Petroleum Company, a corporation of Delaware
No Drawing. Filed Nov. 6, 1961, Ser. No. 150,131
8 Claims. (Cl. 260—94.9)

This invention relates to improved molding compositions and to a method of producing same. More particularly this invention relates to improved polymeric compositions and to the method of improving same by conditioning a polymeric composition which, in a dry state, normally tends to accumulate static charges of electricity thereon, so as to minimize or obviate this tendency for a prolonged period of time. In one aspect this invention relates to a method for providing long term protection to resinous polymers of monoolefins by the incorporation therein of a small amount of a long chain polyamine as an antistatic agent. In another aspect this invention relates to novel compositions having long term protection against the accumulation of electrostatic charges by having incorporated therein a small amount of a long chain polyamine as an antistatic agent.

Fibers, films, sheets, and molded articles made from resinous polymers of monoolefins are subject to objectionable properties resulting from the accumulation of electrostatic charges thereon. Such accumulation leads to attraction of dust, lint, ash and other particulate materials, causing them a adhere tenaciously thereto. Numerous materials have been incorporated in plastics to alleviate this effect and it has been observed that the effectiveness of such additives varies from one type of plastic to another. For example, antistatic compounds which are highly effective in low density polyethylene are less satisfactory in high density polyethylene. Many antistatic agents are highly effective for short periods of time after which their effect is progressively less and after a few days is entirely lost.

One of the problems confronting manufacturers, molders and users of molded plastics is the collection of dust on the surface of molded articles, especially articles of which the base composition is a polymer of a monoolefin. The dust is tenaciously held on surfaces of the article by electrostatic charges generated thereon, either during fabrication operations or in subsequent handling. For example, polyethylene bottles or containers for merchandise accumulate dust on display shelves almost immediately when placed thereon. Removal of such dust accumulation by wiping, blowing, or other conventional means increases the charge on the polyethylene, thereby leading to an increase in the tendency to accumulate dust. Heretofore some alleviation of this problem has been realized by wiping the surface with an antistatic material such as ethylene glycol, various quaternary ammonium compounds, and the like. Such treatment has been found to be effective for limited periods only since it is lost by evaporation, oxidation, or simple mechanical removal from handling or contact with other articles. Likewise attempts have been made to solve this problem by incorporation of the antistatic material in the polymer thereby overcoming surface losses. Here again the effects have been lost after limited periods of time. Electrostatic charges, as is well known, are confined to the surface of charged articles. Thus only that portion of the material which is at the surface of the resin is effective and with materials heretofore employed, permanent protection is not realized. In addition to these drawbacks encountered in prior art procedures, some additives such as metal powders, finely divided carbon and the like lead to objectionable color in the molded article. Still others have adverse effects on physical properties of the polymer leading to failure of articles molded therefrom.

Thus it is an object of this invention to provide improved polymeric compositions having preferred antistatic properties. Another object of this invention is to provide novel monoolefin polymer compositions which have a prolonged resistance to the buildup of electrostatic charges thereon without any alteration of the other physical properties. A still further object of this invention is to provide a method for destaticizing polymer compositions in a manner so as to eliminate the necessity of a separate destaticizing treatment.

Other objects, aspects and the several advantages of this invention are apparent from study of the disclosure and the appended claims.

In accordance with this invention I have now discovered that long term protection against the development of electrostatic charges in polyolefin plastics can be realized by incorporation therein of a small amount of a long chain polyamine.

The long chain polyamines useful in the invention are compounds of the general formula

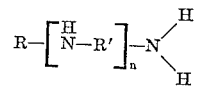

in which R is a straight chain saturated or unsaturated aliphatic group containing from 6 to 20, preferably 8 to 18, and more preferably 10 to 18 carbon atoms, R' is an alkylene group containing from 1 to 3, preferably 2, carbon atoms, and $n$ is an integer from 1 to 4. Typical compounds of this formula include: 1-amino-3,6-diazadodecane, 1-amino-3,6-diazatetradecane, 1-amino-3,6-diazahexadecane, 1-amino-3,6-diazoctadecane, 1-amino-3,6-diazadocosane, 1-amino-3,6-diazatetracosane, 1-amino-3,6-diazahexacosane, 1-amino-3,6,9-triazapentadecane, 1-amino-3,6,9-triazapentacosane, 1-amino-3,6,9-triazanonadecane, 1 - amino - 3,6,9 - triazanonacosane, 1-amino-3,6,9,12-tetraazoctadecane, 1-amino-3,6,9,12-tetraazadocosane, 1-amino-3,6,9,12-tetraazoctacosane, 1-amino-3-azanonane, 1-amino-3-azatridocane, 1-amino-3-azaheptadecane, 1-amino-3-azanonadecane, 1-amino-3-azaheneicosane, 1-amino-2,4-diazadodecane, 1-amino-2,4-diazahexadecane, 1-amino-2,4-diazatetracosane, 1-amino-4,8-diazatetradecane, 1-amino,4,8-diazoctacosane, 1-amino-4-azadodecane, 1-amino-4-azatetradecane, 1-amino-4-azahexadecane, 1-amino-4-azoctadecane, 1-amino-4-azeicosane, 1 - amino-4-azadocosane, 1-amino-4-aza-13-docosene, 1-amino-4-aza-13,16-docosadiene, 1-amino-3,6-diaza-8-octadecane, 1-amino-3,6,9-triaza-12-heneicosene. Mixtures of such compounds can also be used; for example, a mixture comprising 1-amino-4-azadodecane, 1-amino-4-azatetradecane, 1-amino-4-azahexadecane, 1-amino-4-azoctadecane, 1-amino-4-azeicosane, 1-amino-4-azadocosane, and 1-amino-4-aza-13-docosene; a mixture comprising 1-amino-4-azeicosane, 1-amino-4-azadocosane, 1-amino-4-aza-13-docosene, and 1-amino-4-aza-13,16-docosadiene; and a mixture comprising 1-amino-4-azoctadecane, 1-amino-4-azeicosane, 1-amino-4-azadocosane, and 1-amino-4-aza-13-docosene.

The amount of polyamine used will be in the range of from 0.01 to 5.0 and preferably 0.05 to 2.0 weight percent based on weight of resin plus polyamine. Larger amounts can be used if desired. Incorporation in the resin can be made on a roll mill, in a Banbury mixer or by any other similar means. Another effective procedure is to dissolve the additive in a volatile solvent and mix with the pelleted resin. After thorough contacting, the solvent is removed by evaporation and the treated resin fabricated by conventional means.

The resins in which the present invention is applicable include polymers of 1-olefins typified by ethylene, propylene, 1-butene, 1-pentene, 3-methyl-1-pentene and copolymers of such olefins as ethylene-propylene copolymers, ethylene-butene-1 copolymers, etc. The additives can be incorporated along with conventional antioxidants, fillers, pigments, softeners and the like. The additives are also effective in blends or mixtures of two or more of these polymers and they can also be employed in combination with other antistatic agents, if desired.

The following examples are provided further to illustrate this invention.

EXAMPLE I

A series of tests was made to demonstrate the effect of varying amounts of 1-amino-3,6-diazoctadecane ($C_{12}H_{25}$ $NHC_2H_4NHC_2H_4NH_2$ in which $C_{12}H_{25}$ is a straight chain lauryl group) as an antistatic for polyethylene. As controls in these tests two compounds in which the alkyl group designated as R in the general formula set forth above had a branched chain configuration. The first of these (Control 1) was isomeric with 1-amino-3,6-diazoctadecane, the difference being that the $C_{12}H_{25}$ radical was derived from propylene tetramer, i.e. was a tetramethyl substituted octyl group. The second (Control 2) was 1-amino-3,6-diaza-8-ethyldodecane, i.e. the R group was a 12-ethylhexyl radical. The polyethylene used was prepared by polymeriaztion of ethylene in the presence of a chromium oxide catalyst and had a density of 0.960 at 20° C. and a melt index of 0.9. Incorporation of the additive was effected on a 6" laboratory roll mill with rolls heated with steam to approximately 300° F. Compositions were prepared containing 0.25, 0.5, 1.0, 2.0, 3.0, and 4.0 weight percent additive based on the weight of resin plus polyamine. After mixing thoroughly, the polymer was removed from the mill and when cool was chopped. From the chopped polymer slabs 5" x 7" x 1/16" were compression molded at 350° F. in a laboratory press and cooled by circulating water through the platens, the cooling rate being 25° F. per minute. For testing the slabs were stroked with wool, silk, cotton and nylon after which the presence of static electrical charge was measured with a Keithley Model 250 Staticmeter fitted with a 2501 detecting head. It was observed that at charges of less than 3 kilovolts, no pickup of dust occurred. Data on these tests are shown in Table I.

Table I

| Amount additive (percent by wt.) | | | Duration test (days) | Charge (kv.) |
|---|---|---|---|---|
| Compound of invention | Controls | | | |
| | 1 | 2 | | |
| ---------- | --- | --- | ---------- | 14 |
| 0.25 | --- | --- | a 47 | 3 |
| 0.50 | --- | --- | a 47 | 0 |
| 1.00 | --- | --- | a 188 | 0 |
| 2.00 | --- | --- | a 156 | 0 |
| 3.00 | --- | --- | a 188 | 0 |
| 4.00 | --- | --- | a 156 | 0 |
| ---------- | 1.0 | --- | 2 | 3 |
| ---------- | 2.0 | --- | 2 | 5 |
| ---------- | --- | 0.5 | 1 | 4 |
| ---------- | --- | 1.0 | 1 | 1 | a Compounds still effective.

These data demonstrate that the straight chain polyamine, 1-amino-3,6-diazoctadecane, was effective for prevention of static for more than six months while branched chain compounds failed within 24 hours.

EXAMPLE II

A series of tests was made to demonstrate the effect of varying amounts of high molecular weight polyamines as antistatic additives for polyethylene. The polyethylene used, the method of incorporation, and the test procedure were the same as described in Example I. The additives used were mixtures of compounds of the formula $$R-NH(CH_2)_3NH_2$$

These additive compositions are identified in Table II by the percent of each constituent as identified by the R groups (see above formula).

Table II

ANTISTATIC COMPOSITIONS

| Composition Number | 1 | 2 | 3 |
|---|---|---|---|
| Octyl, percent | 8.25 | | |
| Decyl, percent | 9.17 | | |
| Dodecyl, percent | 48.50 | | |
| Tetradecyl, percent | 18.60 | | 2 |
| Hexadecyl, percent | 5.16 | 18.4 | 24 |
| Octadecyl, percent | 5.16 | 15.6 | 28 |
| Octadecenyl (oleyl), percent | 5.16 | 23.8 | 46 |
| Octadecadienyl (linoleyl), percent | | 42.2 | |

Data on the antistatic effects of these additive compositions in polyethylene are shown in Table III.

Table III

| Additive (composition) | Amount (wt. percent) | Duration test (days) | Charge (kv.) |
|---|---|---|---|
| None | None | None | 14 |
| 1 | 0.25 | 32 | 3 |
| 1 | 0.50 | 32 | None |
| 1 | 1.0 | a 43 | None |
| 1 | 2.0 | a 43 | None |
| 1 | 4.0 | a 43 | None |
| 2 | 0.25 | 32 | 4 |
| 2 | 0.50 | 32 | 3 |
| 2 | 1.0 | a 43 | None |
| 2 | 2.0 | a 43 | None |
| 2 | 4.0 | a 43 | None |
| 3 | 0.25 | 32 | 1 |
| 3 | 0.50 | 32 | None |
| 3 | 1.0 | a 43 | None |
| 3 | 2.0 | a 43 | None |
| 3 | 4.0 | a 43 | None | a Compounds still effective.

These data show that at levels of 0.5 percent and higher, development of static electricity is entirely prevented or maintained at levels at which little if any dust pickup occurs.

The antistatic compositions with which this invention is concerned not only are capable of imparting antistatic characteristics to olefin polymers which normally, when dry, have a tendency to accumulate electrostatic charges, but in general they are also able to effect this result without detrimentally affecting the color, tensile strength, elasticity, chemical resistance, bacterial and fungal resistance and other valuable properties of the resin. In other words, the desired prolonged antistatic property is achieved without rendering the polymer composition in any way unsuited for its intended purpose.

It will be understood by those skilled in the art that the compositions of the present invention may also include fillers, dyes, or other coloring matter and such other additives as are commonly employed to facilitate the use of resins in molding processes, e.g., plasticizers, or the like, without departing from the intended scope of this invention.

Reasonable variation and modification are possible within the scope of the foregoing disclosure and the appended claims to the invention.

I claim:
1. A composition consisting essentially of a resinous polymer of a 1-olefin destaticized by the addition thereto of a long chain polyamine of the general formula

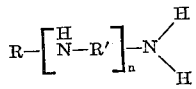

in which R is a member of the group consisting of a straight chain saturated aliphatic group and a straight chain unsaturated aliphatic group containing from 6 to 20 carbon atoms, R' is an alkylene group containing from 1 to 3 carbon atoms and $n$ is an integer from 1 to 4 in an amount sufficient to destaticize said polymer.

2. The composition of claim 1 wherein the polyamine is present in an amount of about 0.01 to 5 weight percent based on the total weight of resinous polymer and polyamine.

3. The composition of claim 1 wherein the amine is present in the range of from 0.05 to 2.0 weight percent based on total weight of resinous polymer and polyamine.

4. A destaticized polymeric composition comprising a polymer of a monoolefin selected from the group consisting of ethylene, propylene, 1-butene, 1-pentene, 3-methyl-1-pentene and copolymers thereof and a long chain polyamine selected from the group consisting of 1-amino-3,6-diazadodecane, 1-amino-3,6-diazatetradecane, 1-amino-3,6-diazahexadecane, 1-amino-3,6-diazoctadecane, 1-amino-3,6-diazadocosane, 1-amino-3,6-diazetetracosane, 1-amino-3,6-diazahexacosane, 1-amino-3,6,9-triazapentadecane, 1-amino-3,6,9-triazapentacosane, 1-amino-3,6,9-triazanonadecane, 1-amino-3,6,9-triazanonacosane, 1-amino-3,6,9,12-tetraazoctadecane, 1-amino-3,6,9,12-tetraazadocosane, 1-amino-3,6,9,12-tetraazoctacosane, 1-amino-3-azanonane, 1-amino-3-azatridocane, 1-amino-3-azaheptadecane, 1-amino-3-azanonadecane, 1-amino-3-azaheneicosane, 1-amino-2,4-diazadodecane, 1-amino-2,4-diazahexadecane, 1-amino-2,4-diazatetracosane, 1-amino-4,8-diazatetradecane, 1-amino-4,8-diazoctacosane, 1-amino-4-azadodecane, 1-amino-4-azatetradecane, 1-amino-4-azahexadecane, 1-amino-4-azoctadecane, 1-amino-4-azeicosane, 1-amino-4-azadocosane, 1-amino-4-aza-13-docosene, 1-amino-4-aza-13,16-docosadiene, 1-amino-3,6-diaza-8-octadecene and 1-amino-3,6,9-triaza-12-heneicosene.

5. A composition of claim 4 wherein the polymer is polyethylene and the long chain polyamine is 1-amino-3,6-diazoctadecane.

6. A destaticized polymeric composition comprising a polymer of a monoolefin selected from the group consisting of ethylene, propylene, 1-butene, 1-pentene, 3-methyl-1-pentene and copolymers thereof and a long chain polyamine comprising a mixture of 1-amino-4-azadodecane, 1-amino-4-azatetradecane, 1-amino-4-azahexadecane, 1-amino-4-azoctadecane, 1-amino-4-azeicosane, 1-amino-4-azadocosane, and 1-amino-4-aza-13-docosene.

7. A destaticized polymeric composition comprising a polymer of a monoolefin selected from the group consisting of ethylene, propylene, 1-butene, 1-pentene, 3-methyl-1-pentene, and copolymers thereof and a long chain polyamine comprising a mixture of 1-amino-4-azeicosane, 1-amino-4-azadocosane, 1-amino-4-aza-13-docosene and 1-amino-4-aza-13,16-docosadiene.

8. A destaticized polymeric composition comprising a polymer of a monoolefin selected from the group consisting of ethylene, propylene, 1-butene, 1-pentene, 3-methyl-1-pentene and copolymers thereof and a long chain polyamine comprising a mixture of 1-amino-4-azoctadecane, 1-amino-4-azeicosane, 1-amino-4-azadocosane, and 1-amino-4-aza-13-docosene.

References Cited by the Examiner

UNITED STATES PATENTS

| | | | |
|---|---|---|---|
| 2,403,960 | 7/1946 | Stoops et al. | 260—583 |
| 2,921,048 | 1/1960 | Bell et al. | 260—45.9 |

LEON J. BERCOVITZ, *Primary Examiner.*

A. D. SULLIVAN, *Examiner.*